United States Patent [19]

Abelin et al.

[11] 3,710,678

[45] Jan. 16, 1973

[54] JETTISONABLE POD FOR AIRCRAFT CARRIED ROCKET MISSILES

[75] Inventors: Rudolf Abelin, Fack; Nils Soren Lennart Johansson; Anders Borje Hakansson, both of Linkoping, all of Sweden

[73] Assignee: Saab-Scania Aktiebolag, Sweden

[22] Filed: April 21, 1971

[21] Appl. No.: 135,897

[52] U.S. Cl. .............................. 89/1.816, 89/1.817
[51] Int. Cl. .................................................. F41f 3/06
[58] Field of Search..... 89/1.814, 1.815, 1.816, 1.817

[56] References Cited

UNITED STATES PATENTS

| | | | |
|---|---|---|---|
| 3,048,086 | 8/1962 | Robert et al. | 89/1.817 |
| 2,931,273 | 4/1960 | Weatherhead, Jr. | 89/1.817 |
| 3,315,565 | 4/1967 | Nash | 89/1.814 X |
| 3,319,522 | 5/1967 | Gould et al. | 89/1.815 X |

FOREIGN PATENTS OR APPLICATIONS

| | | | |
|---|---|---|---|
| 1,394,734 | 3/1965 | France | 89/1.816 |

*Primary Examiner*—Samuel W. Engle
*Attorney*—Ira Milton Jones

[57] ABSTRACT

A pod for aircraft carried rocket missiles has its body molded of foam plastic, with parallel bores therein, each providing a missile chamber. There is a rigid tube in a bore spaced from the top of the body. A rigid wall member closely overlies the top surface of the body along a substantial part of its length; suspension eyes are secured to it. Rods embedded in the body material connect the tube and wall member to define a rigid beam that stiffens the body and supports air and mass loads on it.

7 Claims, 3 Drawing Figures

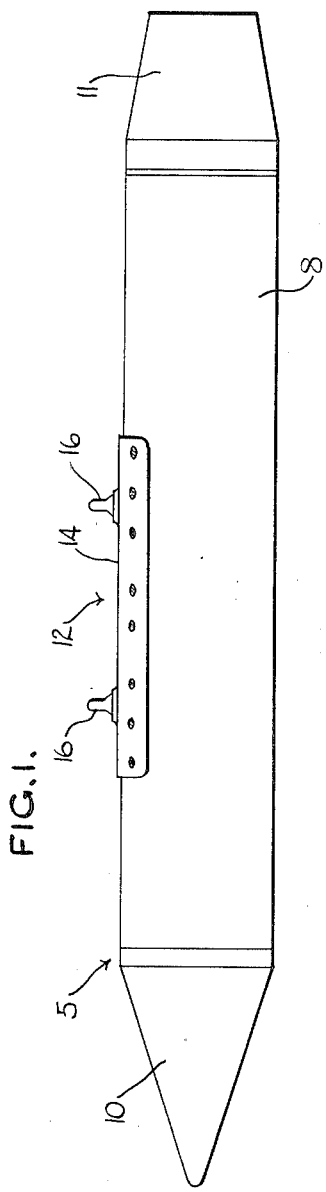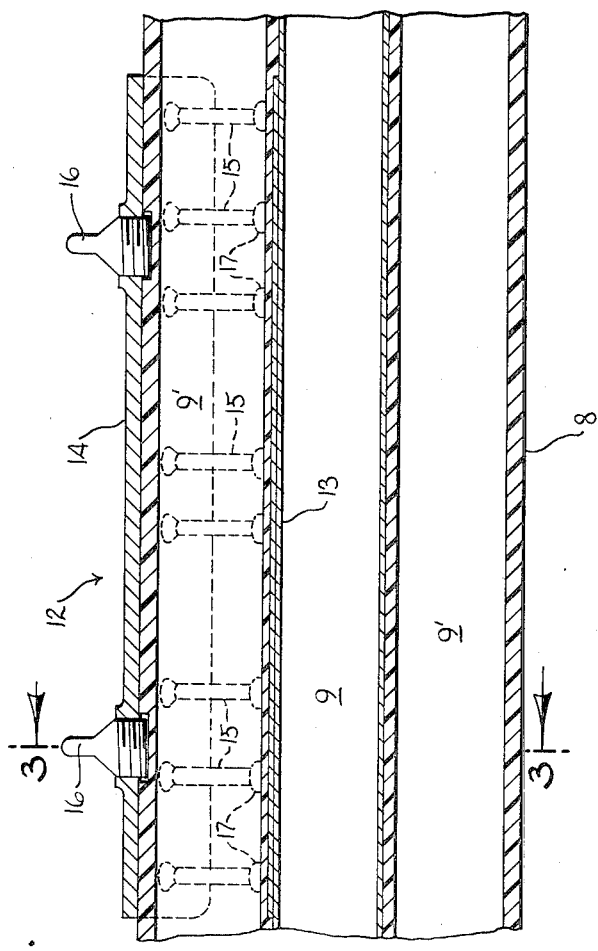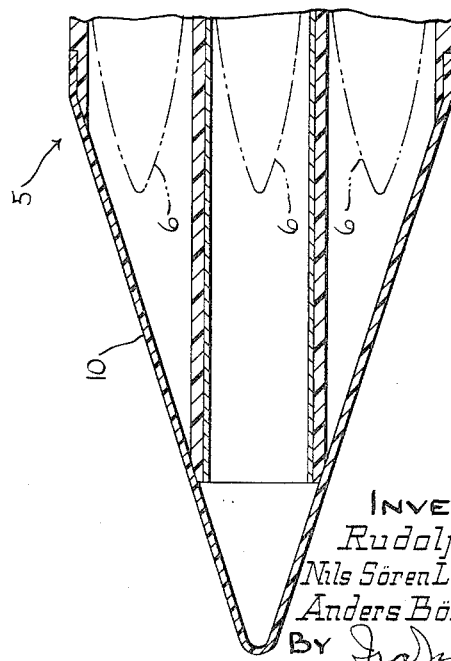

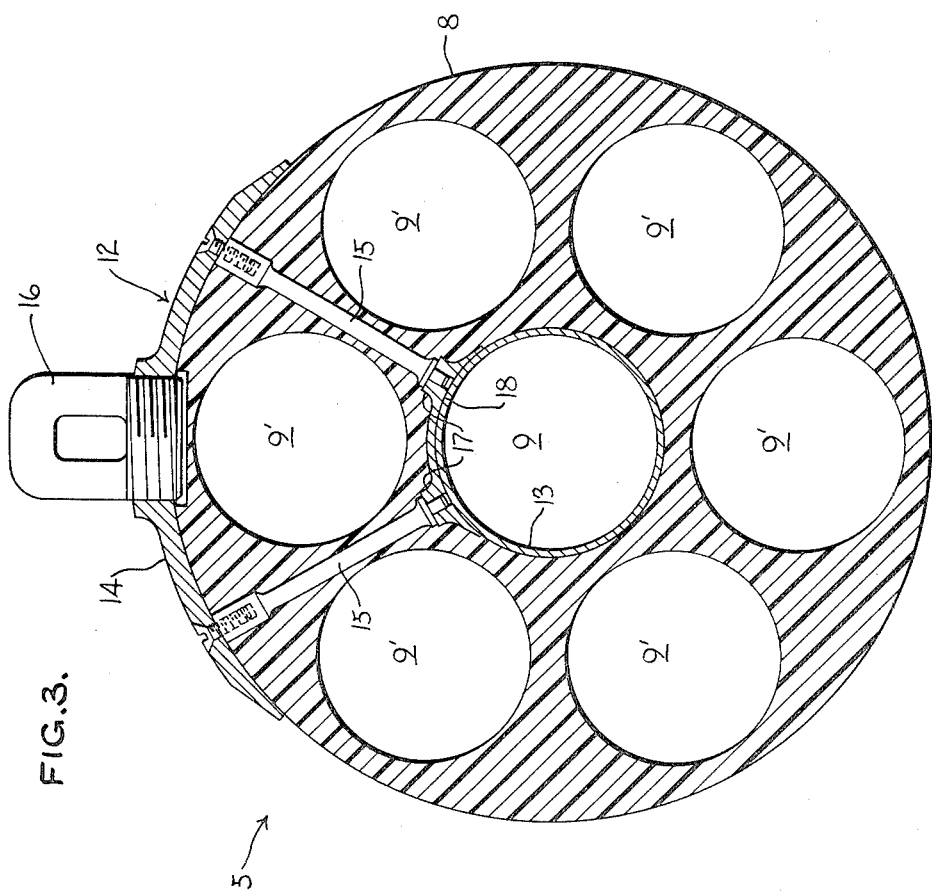

JETTISONABLE POD FOR AIRCRAFT CARRIED ROCKET MISSILES

This invention relates to carrier pods for aircraft carried rocket missiles, and has more particular reference to an inexpensive jettisonable missile pod.

Rocket missiles to be launched from military aircraft are mounted in carriers externally fitted on the aircraft. Two types of rocket missile carriers have heretofore been employed. One of them comprises a pod-like enclosure for a group of missiles, which is jettisoned after its store of missiles has been discharged. With the other type of carrier the missiles are exposed during flight to the launching point, the carrier being essentially a launching rack from which the missiles can be readily released and which is arranged to afford guidance to them during launching.

The pod-type of carrier has a frangible nose cone which is jettisoned just before the first missile is launched from it, or simultaneously with that launching. As compared with open launching racks, the pod has the advantage of providing both protection to the missiles it carries and streamlining for them from takeoff to the point of their discharge.

However, the pod carrier has heretofore had the disadvantage of being rather heavy and therefore not well suited for light aircraft.

An additional and very important disadvantage of prior pod-type missile carriers has been that they were rather expensive, especially in view of the fact that a pod carrier is used only for a single one-way trip. After the store of missiles has been launched from it, the pod-type carrier is unstreamlined, and therefore it is ordinarily jettisoned as soon as it is emptied, in order to get rid of its weight and drag for the return portion of the mission. Such pods have usually comprised a plurality of metal tubes, one for each missile to be carried in the pod, and a plurality of transverse panels or the like that were rigidly secured to the tubes and to the outer skin of the pod to form a rigid structure. This was obviously a complicated and costly device to be discarded after only one use, and even though an aircraft was able to carry its rather considerable weight, the performance of the aircraft inevitably suffered from it.

The present invention, by contrast, has for its object to provide a pod-like missile carrier which is substantially lighter than those heretofore available, so as to represent a decreased load for the carrying aircraft, and which is substantially cheaper so as to represent a considerably smaller economic loss upon jettisoning.

Hence it is another object of this invention to provide a missile carrier pod which encloses and streamlines a group of rocket missiles and which is light enough to be carried by light aircraft.

Another and more specific object of this invention is to provide a pod for a plurality of aircraft carried rocket missiles wherein the main body of the pod is moulded from light and inexpensive plastic material such as polyurethane foam, and wherein there is a frame that supports and reinforces the light body, which frame comprises a rigid tube that defines one of the missile chambers in the pod and a rigid member at the exterior of the pod body to which are attached connectors for mounting the pod on an aircraft.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according toe the best mode so far devised for the practical application of the principles thereof, and in which:

FIG. 1 is a view in side elevation of a rocket missile pod embodying the principles of this invention;

FIG. 2 is a longitudinal sectional view of the missile pod on a larger scale than FIG. 1; and FIG. 3 is a cross-sectional view taken on the plane of the line 3—3 in FIG. 2.

Referring now more particularly to the accompanying drawings, the numeral 5 designates generally an elongated missile carrier embodying the principles of this invention, adapted to be releasably carried on the exterior of an aircraft (not shown), usually in a position under its wing, and which protectively carries and streamlines a group of rocket missiles 6. In the present case the pod has a generally cylindrical body 8 in which seven missiles are carried, one in a central chamber 9 that is coaxial with the pod, and the other six in similar chambers 9' that are circumferentially equispaced from one another and radially equidistant from the central chamber. The axes of the several chambers are of course parallel to one another.

The pod is provided with a hollow nose cone 10 of readily frangible plastic or the like, by which the pod is streamlined and by which the missiles in it are protected. It will be understood that the nose cone 10 is jettisoned just before the first missile 6 is launched, or simultaneously with its launching. Such jettisoning can be accomplished in a known manner, as by detonating fragmentation of the nose cone or by having the first-launched missile punch through it or carry it away. Those skilled in the art will appreciate that a suitable tail cone 11 is also provided to streamline the aft end of the cylindrical pod body.

The body 8 of the missile pod is molded of a light, porous plastic material such as polyurethane foam. However, this relatively light body is stiffened and supported by a frame which is designated generally by 12 and which comprises a rigid tube 13 that defines the wall of the central chamber 9, a rigid wall member 14 which overlies the exterior of the body 8 at the top thereof and extends along a substantial part of the length of the body, and rigid connecting members 15 which are rigidly secured to the tube 13 and to the wall member 14 and which are embedded in the material of the body.

The wall member 14 is preferably made of light metal. To it are anchored suspension eyes 16 that cooperate with releasable latching hooks (not shown) or the like for jettisonably mounting the pod on an aircraft.

The tube 13 can likewise be of metal, preferably aluminum. Its inside diameter is such that it can guidingly accommodate a missile, and, assuming that all missiles to be carried in the pod are identical, its inside diameter can be the same as the diameter of each of the other compartments 9'.

The rigid connecting members 15 can comprise metal arms or rods, as shown. Preferably one of the outer missile compartments 9' is located directly above the central chamber 9, and the connecting members extend radially to the tube 13, at opposite sides of the uppermost compartment 9', so that the members 15 are embedded in the portions of the pod body that provide the septums between said uppermost chamber and the two outer chambers 9' that are circumferentially adjacent to it.

The connecting members 15 can be rigidly secured to the tube 13 in any suitable manner. As shown, they are received in threaded bosses 17 in a curved anchor plate 18 that closely embraces the upper portion of the tube 13, and the plate 18 is in turn secured to the tube as by bonding or by means of screws. The rods could obviously be fastened directly to the tube 13 or formed integrally with it.

If the connecting members comprise rods, as shown, they are preferably arranged in radially diverging pairs, with the two rods of each pair having their axes in a plane normal to the axis of the pod body and with pairs of rods at lengthwise spaced intervals along the tube. It will be evident from FIG. 3 that the connecting members could comprise a pair of perforated web plates extending lengthwise along the tube, each web plate being, in effect, an integrated row of rods.

The frame or beam 12 comprising the connected tube 13, wall member 14 and members 15 transmits to the suspension eyes 16 all of the air and mass loads that are imposed upon the pod body 8 by air forces against it, its own weight, and the weight of missiles that it houses.

In manufacturing the missile pod of this invention the tube 13 and connecting members 15 are secured together and are inserted into a mold which is to define the body and which has cores to define the missile chambers 9'. The mold is filled with fermentable polyurethane or the like and is closed while the plastic material ferments or expands. After the plastic has hardened it is removed from the mold and the cores are withdrawn. The molding process is such that the foam plastic material which is adjacent to the surfaces of the pod body is more compressed and dense than the remainder thereof, to provide, in effect, adequately strong walls and smooth guiding surfaces for the outer missile chambers 9'.

After the body member has been withdrawn from the mold and the cores have been removed from it, the wall member 14 is secured to the remainder of the pod structure. Preferably the wall member is cemented to the upper surface of the pod body and is secured to the connecting members 15 by means of screws or other rigid securement devices. The pod body and the tube 13 are shaped to provide for installation of the nose cone 10 in any suitable manner.

From the foregoing description taken with the accompanying drawings it will be apparent that this invention provides a very inexpensive and lightweight jettisonable pod for carrying rocket missiles to be launched from an aircraft in flight.

Those skilled in the art will appreciate that the invention can be embodied in forms other than as herein disclosed for purposes of illustration.

The invention is defined by the following claims:

1. A pod to be jettisonably mounted on the exterior of an aircraft for carrying and launching a plurality of rocket missiles, said pod defining a plurality of elongated bore-like compartments, one for each missile to be carried, which compartments have their axes parallel to one another, said pod comprising;
   A. a body of light, porous, inexpensive and readily moldable material, the material of said body member defining
      1. a substantial portion of the exterior surface of the pod, and
      2. the interior surfaces of all but that one of said compartments which is radially nearest the center of the pod; and
   B. rigid means for supporting mass and air load forces on the body member and for transmitting them to a carrying aircraft, said rigid means comprising
      1. a rigid tube which extends lengthwise in the body member and which defines the interior surface of said one compartment,
      2. a rigid wall member overlying the top surface of the body member along a substantial portion of the length thereof and on which there are means for securing the pod to an aircraft, and
      3. rigid means embedded in the material of the body member and anchored to said tube and said wall member at locations spaced lengthwise along them and thus cooperating with the tube and the wall member to define a rigid beam.

2. The jettisonable pod of claim 1, further characterized by:
   a nose cone of readily frangible plastic material at the front of the body member, closing the fronts of said compartments to protect missiles therein and streamline the pod.

3. The jettisonable pod of claim 1, further characterized by:
   the body member being of foam thermoplastic material, the portions of said material that are adjacent to and define the exterior surface of the pod and the interior surfaces of the compartments other than said one compartment being of higher density than the remainder thereof.

4. A jettisonable pod in which a plurality of rocket missiles can be carried at the exterior of an aircraft, and from which they receive guidance at launching, said pod comprising:
   A. an elongated body member of porous plastic material having a plurality of substantially parallel lengthwise extending bores, each defining a missile compartment, said body member also defining a substantial portion of the exterior surface of the pod;
   B. a rigid tube in only one of said bores, said one bore being substantially centered on a vertical plane through the axis of the body member and spaced below the top thereof;
   C. means cooperating with said tube to provide rigid support and reinforcement fro the body member, said means comprising 1. a rigid elongated wall member overlying a portion of the body member at its top and along a substantial part of its length, and
2. rigid means extending through the material of the body member in embedded relation thereto and having rigid connections with said tube and with said wall member at spaced locations along their lengths; and D. on said wall member for releasably securing the pod to a carrying aircraft.

5. The jettisonable pod of claim 4, wherein the body member is substantially cylindrical, and one of the other bores is directly above the tube, further characterized by:

said rigid means comprising members extending substantially radially to said tube and disposed at opposite sides of said one other bore.

6. The jettisonable pod of claim 4, further characterized by:

said rigid means comprising rods extending substantially radially to the tube at lengthwise spaced locations therealong.

7. The jettisonable pod of claim 6, further characterized by:

said rods being arranged in pairs, the rods of each pair being in a common plane normal to the axis of the tube and being upwardly divergent from one another.

* * * * *

UNITED STATES PATENT OFFICE
CERTIFICATE OF CORRECTION

Patent No. 3,710,678      Dated January 16, 1973

Inventor(s) Rudolf Abelin

It is certified that error appears in the above-identified patent and that said Letters Patent are hereby corrected as shown below:

Column 4 - line 11

<u>Claim 1 - A.</u> (a body of light) should read
                    a body <u>member</u> of light Column 5 - line 9

<u>Claim 4 - D.</u> ( on said ) should read
                    <u>means</u> on said Signed and sealed this 29th day of May 1973.

(SEAL)
Attest:

EDWARD M. FLETCHER, JR.      ROBERT GOTTSCHALK
Attesting Officer             Commissioner of Patents